United States Patent [19]
Kitamaru et al.

[11] 3,886,056
[45] May 27, 1975

[54] PROCESS FOR PRODUCING A HIGH MELTING TEMPERATURE POLYETHYLENE EMPLOYING IRRADIATION AND ORIENTING

[76] Inventors: Ryozo Kitamaru, 11, Hanazonoenjyoji-cho, Ukyo-ku, Kyoto-shi; Hyon Don Chu, 5-36-8, Honmachi, Koganei-shi, Tokyo-to; Waichiro Tsuji, 181/16, Manjyojiki-cho, Fukakusa-Okamedani, Fushimi-ku, Kyoto-shi, all of Japan

[22] Filed: Nov. 1, 1972

[21] Appl. No.: 302,761

[30] Foreign Application Priority Data
Nov. 1, 1971  Japan.............................. 46-86981

[52] U.S. Cl. .............. 204/159.2; 264/22; 264/289; 264/290
[51] Int. Cl. .......................... B01j 1/10; B01j 1/12
[58] Field of Search ................................ 204/159.2

[56] References Cited
UNITED STATES PATENTS

| | | |
|---|---|---|
| 2,904,480 | 9/1969 | Rainer et al. .................... 204/159.2 |
| 3,081,571 | 3/1963 | Dayen et al...................... 204/159.2 |
| 3,144,399 | 8/1964 | Rainer et al. .................... 204/159.2 |
| 3,663,662 | 5/1972 | Golike et al. .................... 204/159.2 |
| 3,736,218 | 5/1973 | Gregorian et al................ 204/159.2 |

*Primary Examiner*—Murray Tillman
*Assistant Examiner*—Richard B. Turer
*Attorney, Agent, or Firm*—Armstrong, Nikaido & Wegner

[57] ABSTRACT

A process for producing a high melting temperature polyethylene which comprises irradiating a polyethylene with an ionizing radiation to produce crosslinked polyethylene having a gel content of at least one weight percent, extending the crosslinked polyethylene in at least one direction at a temperature at least an anisotropic melting point of the crosslinked polyethylene and cooling the crosslinked polyethylene, said starting polyethylene having a viscosity average molecular weight of at least $1 \times 10^5$ and having a melting point of 137° to 138°C when crystallized isothermally from the melt at a temperature of 130°C.

8 Claims, No Drawings

PROCESS FOR PRODUCING A HIGH MELTING TEMPERATURE POLYETHYLENE EMPLOYING IRRADIATION AND ORIENTING

The present invention relates to a process for preparing polyethylene having highly raised melting and softening temperatures and improved transparency with excellent dimensional stability at high temperatures from polyethylene having a high crystallinity.

As known in the art polyethylene polymers made by the so-called low pressure or medium pressure polymerization procedure usually have high crystallinity, of which those having higher crystallinity have a melting point of 137° to 138°C if crystallized isothermally from the melt at a temperature of 130°C. The molecules of the polymers having higher crystallinity mostly consist of a linear sequence of methylene units, and the mechanical properties, chemical stability, and electric resistance thereof are excellent. Accordingly it is widely used today when those properties are required.

Although polyethylene of this kind has found versatile applications because of the above mentioned characteristics, there are some properties to be improved. For example, melting point and softening point thereof are not satisfactorily high in many uses. Further, it is liable to shrink at a high temperature and lacks transparency.

To improve these properties various attempts have been made. For example, it has been proposed to irradiate polyethylene moldings such as bottle, container, etc. with ionizing radiation for crosslinking thereof. Although the polyethylene thus irradiated has improved dimensional stability at high temperatures, melting point as well as softening point thereof can not be increased with no improvement in transparency.

Procedures for preparing polyethylene of high melting temperature have been recently developed without irradiation crosslinking. Those procedures comprise the crystallization of the polymer either from the flowing melt in a capillary under extremely high pressure and high shear or from the molten drop with an extremely high rate of quenching under high shear. It was reported that polyethylene strand or film made by those procedures had a very high melting temperature, for example, of 150°C with excellent transparency. In any case, to prepare polyethylene of very high melting temperature through above-cited procedures, very severe conditions such as extremely high pressure are essential.

An object of the invention is to provide a process for producing polyethylene having a highly raised melting point as well as softening point.

Another object of the invention is to provide a process for producing polyethylene having excellent dimensional stability at high temperatures.

Another object of the invention is to provide a process for producing polyethylene having excellent transparency.

Another object of the invention is to provide a process for producing polyethylene having the above excellent properties with simple procedures.

These and other objects of the invention will be apparent from the following description.

The process of the present invention comprises irradiating a polyethylene with an ionizing radiation to produce crosslinked polyethylene having a gel content of at least one weight percent, extending the crosslinked polyethylene in at least one direction at a temperature of at least anisotropic melting point of the crosslinked polyethylene and cooling the crosslinked polyethylene, said starting polyethylene having a viscosity average molecular weight of at least $1 \times 10^5$ and having a melting point of 137° to 138°C when crystallized isothermally from the melt at a temperature of 130°C.

Throughout the specification and claims "gel content" is intended to mean the amount in weight percent of polyethylene insoluble in boiling xylene, based on the weight of the total amount of the polyethylene tested.

According to the researches of the present inventors it has been found that when the above specific polyethylene is subjected to irradiation crosslinking to a proper degree crosslinked polyethylene having high elasticity in a molten state can be obtained without decreasing melting point of the polymer and that when the crosslinked polymer is extended or stretched in molten state and then cooled for crystallization (1) the melting point and softening point of the polymer increases markedly, (2) dimensional stability at high temperature is improved and (3) transparent polymer is obtainable when the extending or stretching step is conducted under increased pressure.

The starting polyethylene to be used in the invention is selected from those made by low or medium pressure polymerization of ethylene. Employable in the invention are those having a viscosity average molecular weight of at least $1 \times 10^5$ and having a melting point of 137° to 138°C when crystallized isothermally from the melt at a temperature of 130°C. If the molecular weight is smaller than the limit, a greater amount of crosslinked units have to be introduced to assure elasticity, this lowering the melting temperature of the final product. Further, if the melting point of the polymer obtained by isothermal crystallization is not sufficiently high, the same drawback will result. Generally, polyethylene available in the art and having a viscosity average molecular weight of less than $4 \times 10^6$ can be used in the invention. Preferably molecular weight is in the range of $2 \times 10^5$ to $1 \times 10^6$. The polyethylene is used in the invention in the form of fiber, film and sheet.

In accordance with the present invention, the starting polyethylene is first crosslinked by irradiation with an ionizing radiation so as to produce crosslinked polyethylene having a gel content of at least one weight percent. Preferable examples of ionizing radiation are X-ray, γ-ray, electron beams, etc. The gel content of the resultant crosslinked polymer should be one weight percent or more. This assures that the polymer will display elasticity which allows it to be extended effectively in the molten state in the subsequent step. If it is lower than one weight percent, the polymer will tend to flow when melted in the subsequent extending step. Gel content of 95 weight percent which is usually the upper limit of gel content by radiation crosslinking of polyethylene is effective in the invention, but preferable gel content is usually in the range of 40 to 70 weight percent. The temperature to be applied is room temperature or an elevated temperature up to 150°C. Although it is possible to conduct the crosslinking step in air, preferably it is carried out in vacuum or in an inert gas atmosphere such as nitrogen. The dosage of the ionizing radiation may vary over a wide range in accordance with the starting polyethylene to be used, temperature, atmosphere, gel content of the polymer to be obtained and other factors. For example, the higher the molecular weight, the lower is the dosage. The relation between molecular weight of the polymer and preferable dosage thereto is as follows:

| Viscosity average molecular weight | Dosage (Mega rads) |
|---|---|
| $1 \times 10^5$ | 4 – 16 |
| $1 \times 10^6$ | 0.8 – 3.2 |
| $4 \times 10^6$ | 0.2 – 0.8 |

According to the invention the crosslinked polyethylene is then extended or stretched in the molten state at a temperature of at least anisotropic melting point of the polymer. Usually such temperature is at least 150°C to a decomposition temperature of the polymer, since the anisotropic melting point thereof is not lower than 150°C. Preferable temperature is in the range of 160° to 190°C. Conventional extending means are applicable to the invention. For example, a conventional continuous drawing equipment may be used for stretching polyethylene fibers and films. Further, rolling and inflation apparatuses known in the art can be used for polyethylene films. If transparent polyethylene film or sheet is to be obtained, it is preferable to conduct the extending under an increased pressure. Such increased pressure usually ranges from 1 to 50 kg/cm². The degree of extending is preferably as large as possible but usually it is in the range of $2.5 \times 2.5 - 3.5 \times 3.5$ times, i.e., 1/6.25 to 1/12.25 time in terms of thickness reduction (biaxially) or 6 to 10 times, i.e., 1/6 to 1/10 time in terms of sectional area reduction (uniaxially).

The crystallization subsequent to the extending in the molten state can be conducted at any temperature, because the rate of crystallization under the extended state is extremely rapid. Actually, after extending of crosslinked sample in the molten state, products having many advantageous properties such as very high melting temperature, excellent mechanical properties, excellent transparency and etc. are obtained independent of the condition for the crystallization. For example, it may be rapidly cooled or very slowly cooled to room temperature, so far as the extended dimension is maintained during the process.

For a better understanding of the invention examples are given below, in which physical properties are determined by the following methods:

| | |
|---|---|
| Dynamic modulus: | measured at 110 cps at 25°C using Tensilon of Toyo Measuring Instrument Comp. Ltd., Japan |
| Young's modulus, strength at break and elongation at break: | at 25°C using Tensilon defined above |
| Shrinking temperature: | temperature at which shrinkage occurs when sample was heated in air |
| Shrinking in percentage: | shrinkage in percentage when sample was heated in air with a temperature-increasing rate of 1°C/min. |
| Transparency: | examined with unaided eye |
| Tensile strength: | at 25°C using Tensilon defined above |
| Tensile elongation: | at 25°C using Tensilon defined above |
| Shrinkage in boiling water: | shrinkage in percent when sample was placed in boiling water for 2 hours |

EXAMPLE 1

A molecular weight fraction with a viscosity average molecular weight of $3.4 \times 10^6$ was obtained from a high density polyethylene by a liquid-liquid phase separation technique disclosed by H. Okamoto et al in J. Polymer Sci., 55, 597 (1961). Said high density polyethylene had a viscosity average molecular weight of $2.5 \times 10^6$ and a melting point of 137.2°C when crystallized isothermally at 130°C. About 1.5 mm thick film of the above fraction was first irradiated to 0.25 Mega rads with X-ray from 3 MEV Van de Graaff accelerator at 150°C in high vacuum. A gel sample was obtained by removing the soluble fraction of this irradiated sample with boiling xylene. The gel content of the irradiated sample was 95%.

The gel sample thus obtained was next compressed between two polished metal plates at 180°C until the sample film was reduced to 1/8 and 1/10 the original thickness. Each film was then cooled to room temperature for one hour in the compressed state.

The samples thus compressed at ratios of 1/8 and 1/10 respectively exhibited very high melting temperature and excellent heat-stability and transparency.

The thermodynamic and crystallo-graphic data of the sample of a compression ratio of 1/10 are as follow.

| | | |
|---|---|---|
| 1. | Macroscopic density at 25°C | 0.942 |
| 2. | Melting temperature by DSC | 155.0°C |
| 3. | Degree of crystallinity | |
| | determined from density | 0.65 |
| | determined by DSC | 0.56 |
| 4. | Unit-cell density | 1.002 |

As listed above, although the macroscopic density and accordingly the degree of crystallinity are not so high as crystalline polyethylene, the melting temperature is the highest of all the values reported for polyethylene up to date. Furthermore, the unit-cell density determined by X-ray diffraction technique is the highest of all the values reported for polyethylene. This indicates the existence of a very pure crystalline phase in the sample. Furthermore, X-ray studies revealed that this sample has a very special orientation of the crystalline phase so that the crystal planes (110) or (200) in this sample are oriented almost parallel to the film plane.

The mechanical properties and the heat stabilities of the sample of a compression ratio of 1/8 are as follow.

|  | This sample | Reference sample |
|---|---|---|
| Dynamic modulus (dyne/cm$^2$) | $2.27 \times 10^{10}$ | $1.84 \times 10^{10}$ |
| Young's modulus (kg/cm$^2$) | $1.87 \times 10^4$ | $1.35 \times 10^4$ |
| Strength at break (kg/cm$^2$) | $1.02 \times 10^3$ | $0.30 \times 10^3$ |
| Elongation at break (%) | 84 | 1100 |
| Shrinking temperature (°C) | 125 | 75 |
| Shrinking (%) |  |  |
| at 120°C | 0 | 17.5 |
| 130°C | 12.5 | melt |
| 150°C | 60 | melt |

The reference sample above was prepared by compressing the molecular weight gel fraction obtained in the same manner as above directly at 190°C with a pressure of 50 kg/cm$^2$ to produce a polyethylene film of about 0.19 mm in thickness. In comparison with the reference sample, the present sample has very high moduli, and high strength with low elongation at the break. Particularly, its heat stability is excellent. The strinking starts at 125°C and it shrinks only 12.5% even at 130°C. Thus this product can be used practically in a temperature range up to 125°C.

EXAMPLE 2

About 1.5 mm thick film of the high density polyethylene the same as in Example 1 was irradiated to 2.7 Mega rads at room temperature under vacuum with electron beam from 2 MEV Van de Graaff accelerator. The gel content of this irradiated product was 90%.

The irradiated sample was next compressed between two polished metal plates at 180°C to different degrees and cooled to room temperature for about 7 minutes. The melting temperature and the macroscopic density at 25°C of the products thus obtained were dependent on the degree of compression as listed below.

| Compression ratio* | Density | Melting temperature (°C) |
|---|---|---|
| 1/1 (Not extended) | 0.932 | 136.8 |
| 1/6.7 | 0.9370 | 151.5 |
| 1/8 | 0.9378 | 153.2 |
| 1/10 | 0.9380 | 155.0 |

Note:
*The ratio of the film thicknesses before and after the compression.

The transparency of samples achieved at the compression ratios of 1/6.7, 1/8 and 1/10 was very excellent. Moreover, the dimension of all the compressed samples was prefectly stable up to 125°C.

EXAMPLE 3

1.5 mm thick film of unfractionated "Marlex 50" (Trade mark, high density polyethylene of the Phillips Petroleum Comp., U.S.A.) having a viscosity average molecular weight of 136,000 and a melting poing of 137.5°C when crystallized isothermally from the melt at 130°C was irradiated to 22.5 Mega rads with γ-ray from 60°C at room temperature in vacuum. The gel content of the irradiated product was 77%. The irradiated sample was next compressed between two polished metal plates at 170°C to different degrees and cooled to room temperature by 10 minutes. The macroscopic density at 25°C and melting temperature of the products are listed below.

| Compression ratio | Density | Melting temperature (°C) | Transparency |
|---|---|---|---|
| 1/1 (Not extended) | 0.935 | 130.7 | No |
| 1/7.5 | 0.940 | 135.0 | excellent |
| 1/9.1 | 0.940 | 135.5 | excellent |
| 1/10.5 | 0.941 | 136.5 | excellent |
| 1/14 | 0.944 | 136.7 | excellent |

As can be seen, the products obtained in accordance with the method of the invention (Sample Nos. 2 to 5) had high melting point and excellent transparency and were stable in dimension up to 120°C.

EXAMPLE 4

Fibers 1.5 mm in diameter were made from unfractionated "Marlex 50" (Trade mark, the same as defined in Example 3) through a melt-spinning procedure at 200°C with a screw-extruder type spinning equipment without draft. The fibers thus produced were next irradiated with electron beam from Van de Graaff accelerator in air to dosages of 10 and 20 Mega rads. The gel contents of the irradiated samples thus obtained were as follow.

13 and 44 percent for samples irradiated to 10 and 20 Mega rads, respectively.

The irradiated fibers were next drawn to 14.3 or 10.0 times the original length at 180°C by a continuous drawing equipment for fibers. The properties of the fibers thus obtained are listed in the following table.

| Dosage irradiated (MR) | Drawing | | Tensile | | Young's modulus (kg/mm$^2$) | Shrinkage in boiling water (%) |
|---|---|---|---|---|---|---|
|  | Temp. (°C) | Ratio (times) | Strength (g/d) | Elongation (%) |  |  |
| 0 | 100* | 8.5* | 3.2* | 30* | 314.4* | 8.3* |
| 10 | 180 | 14.3 | 2.8 | 15.8 | 430.7 | 2.1 |
|  | 100* | 9.5* | 3.4* | 15.8* | 333.3* | 8.5* |
| 20 | 180 | 10.0 | 3.2 | 21.1 | 322.8 | 2.3 |
|  | 100* | 7.8* | 2.8* | 23.4* | 257.8* | 8.9* |

Data marked * are reference values.

It is impossible to draw non-crosslinked polyethylene fibers in the molten state and it is usually drawn in a temperature range lower than 120°C. However, the irradiated fibers could be drawn at a high temperatures, for example, of 180°C because of the existence of the crosslinked units or gel contents in the structure. The drawing at 180°C for the irradiated fibers involves a very special mode of crystallization that has never been effected up to date. In the table, data obtained when the drawing was performed in boiling water at 100°C are listed as references. In comparison with the reference data, the drawn fibers at 180°C indicate very high Young's modulus with sufficient tensile properties at break. Particularly, they did not shrink more than 2.3% even when boiled in water for 2 hours.

What we claim is:

1. A process for producing a high melting temperature polyethylene which comprises irradiating a polyethylene with X-rays, γ-rays or electron beam to a dosage of from 0.2 to 16 Megarads to produce crosslinked polyethylene having a gel content of at least one weight percent, extending the crosslinked polyethylene in at least one direction at a temperature of at least the anisotropic melting point of at least 150°C of the crosslinked polyethylene and cooling the crosslinked polyethylene, said starting polyethylene having a viscosity average molecular weight of from $1 \times 10^5$ to $4 \times 10^5$ and having a melting point of 137° to 138°C when crystallized isothermally from the melt at a temperature of 130°C.

2. The process according to claim 1, in which said polyethylene is a polyethylene film.

3. The process according to claim 1, in which said polyethylene is a polyethylene fiber.

4. The process according to claim 1, in which said temperature of extending is in the range of 160° to 190°C.

5. The process according to claim 1, in which said extending step is conducted under an increased pressure of 1 to 50 kg/cm².

6. The process according to claim 1, in which said gel content is in the range of 40 to 70 weight percent.

7. The process according to claim 1, in which said extending of the crosslinked polyethylene is conducted biaxially in the range of 2.5 × 2.5 to 3.5 × 3.5 times.

8. The process according to claim 1 in which said extending of the crosslinked polyethylene is conducted uniaxially in the range of 6 to 10 times.

* * * * *